July 6, 1926.
T. C. MORRIS
AUTOMOBILE BRAKING DEVICE
Filed August 16, 1924
1,591,543
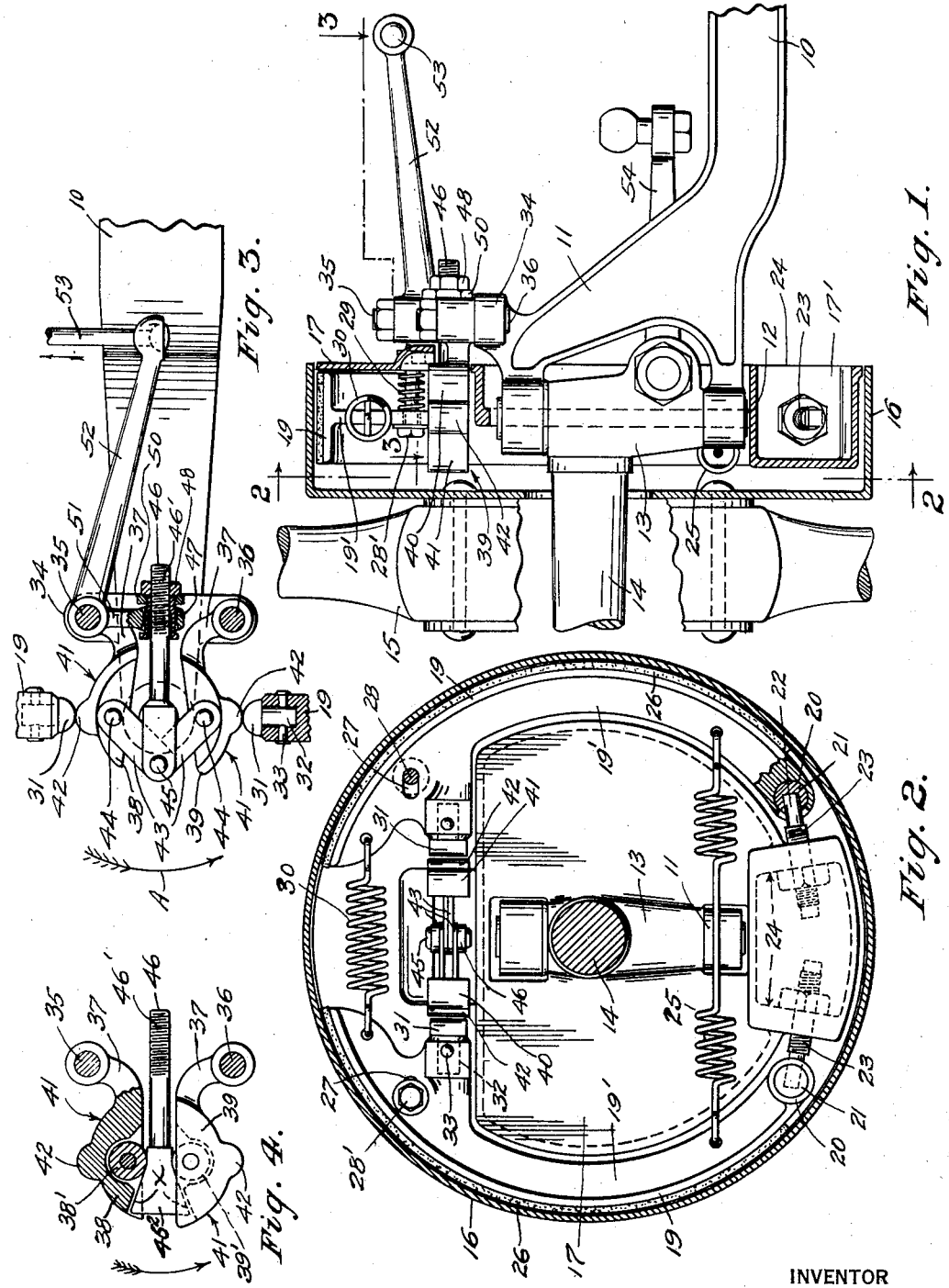
INVENTOR
Thomas C. Morris
BY
Pierre Barnes
ATTORNEY Patented July 6, 1926.

1,591,543

UNITED STATES PATENT OFFICE.

THOMAS C. MORRIS, OF SEATTLE, WASHINGTON.

AUTOMOBILE BRAKING DEVICE.

Application filed August 16, 1924. Serial No. 732,442.

This invention relates to brake devices for use upon the front, or steerable, wheels of motor vehicles and is especially directed to improvements which will afford better braking service for motor propelled vehicles.

More particular objects of the invention are to provide a more compact, simple and efficient construction, in which the parts are arranged to be readily accessible for adjustment and replacement.

Another object is the provision of brake devices of the character referred to which is adapted to be readily applied to steerable wheels and the associated axles hitherto in use.

These objects are attained in the following described manner, as illustrated in the accompanying drawing, in which,—

Figure 1 is a view partly in front elevation and partly in vertical transverse section of devices embodying my invention shown applied. Figs. 2 and 3 are sectional views taken substantially on broken lines 2—2 and 3—3 of Fig. 1. Fig. 4 is a plan view, partly in section, showing a modified construction of the brake-band expanding cam devices.

In the drawing, 10 represents the front axle of an automobile having a forked end 11 which is apertured to receive a vertically disposed pin 12 upon which the steering knuckle 13 is pivotally mounted. Integral with the knuckle 13 is a stub axle 14 upon which a steering vehicle-wheel 15 is journaled.

In carrying out the present invention, there is employed a brake drum 16 which is secured to the wheel 15 for rotating therewith. 17 represents a circular cover-plate for the open inner end of the drum and preferably is held in place as by welding or otherwise securing the plate to the knuckle 13.

Within the drum and engageable with the inner peripheral surface thereof is a brake band herein shown as two complementary brake shoes 19 of substantially T-shapes in transverse section which are disposed at diametrically opposite sides of the drum axis.

As shown, the lower end of each of said brake shoes is formed to provide a transversely disposed bore 20 for a cylindrical body 21 in which is a socket for the end 22 of a set screw 23 which engages in an inclined threaded hole provided in a side wall 24 of a chamber $17^1$ formed in the cover plate 17.

The chamber $17^1$ is open, see Fig. 1, at the inner side of the drum to enable either or both of the set screws 23, one for each brake shoe, to be conveniently adjusted for setting the lower ends of the shoes apart and slightly upwardly in opposition to the power of a spring 25 yieldingly coupling the two shoes in proximity of their lower ends.

The connections above described between the brake shoes and the cylindrical bodies 21 provide pivotal supports for the lower ends of the respective brake shoes; and the set screws 23 provide means for taking up the wear of the brake shoe linings 26.

Adjacent to its upper end each brake shoe is provided with a transversely arranged slot 27 to receive a bolt 28 which is secured to the cover plate 17 and serves as a guide for the respective shoe and likewise as a stop to limit the drum-disengaging movement of a brake shoe which, as shown, is effected by a single spring 30 connected to the upper ends of both shoes. As shown in Fig. 1, a shoe-guiding bolt has a helical spring 29 mounted thereon between the plate 17 and the flange $19^1$ of the respective shoe and acts in conjunction with the bolt head $28^1$ to obviate lateral displacement of the shoe.

Upon the upper portions of both brake shoes are provided, in opposing relation with each other, protuberances 31, hereinafter designated as thrust elements, preferably of substantially semi-cylindrical shapes.

These thrust elements are advantageously of harder material than the brake shoes and to such end are separably connected to the respective shoes as by providing in each of the latter a socket (Fig. 3) to receive the stem 32 of the associated thrust element. Means, such as pins 33, or an equivalent, engaging the stems 32 are utilized for fastening said thrust elements to the shoes.

Secured to or formed integral with the upper bifurcation of the axle's forked end is a bracket 34 from which extend vertically studs or bolts 35 and 36 disposed in spaced apart relation longitudinally of the vehicle.

These studs serve as pivot bearings for the arms 37 of complementary cams 38 and 39 arranged for horizontal movements toward and from each other within the space between the two thrust elements 31 of the brake shoes. Each of said cams has a general shape corresponding to a segment of a circle whose axis is in alignment with the axis of the knuckle pin 12.

More particularly, each of said cams is provided with an arcuate surface 41 at a side of a ridge 42 which is arranged to be in engageable relation with the thrust element 31 of the respective brake shoe when the wheel 15 is in a steering position (Fig. 3) for directing the vehicle straight or nearly so. The cam surfaces 41—41 are respectively disposed at diametrically opposite sides of the axis of the cam assembly and located to oppose the brake shoe thrust elements 31 when the latter are rotated with the wheel in a direction opposite to that indicated by the arrow A in Fig. 3, with respect to a wheel at the right hand side of the vehicle. The cam surfaces 41 and ridges 42 for the brake setting cams of a left hand wheel (not shown) are arranged in reverse order from those shown with respect to a right hand wheel which has been selected for illustrative purposes.

In the embodiment of the invention shown in Figs. 1 and 3 the cams 38 and 39 are operated by means of toggle links 43 which are pivotally connected at 44, Fig. 3, to the cams and also by means of a pivot pin 45, to the forked end of a connecting rod 46, whose other end is connected to the arm 51 of a bell-crank lever the other arm of which is represented by 52. Said bell-crank lever is fulcrumed by the bolt 35 so that the lever arm 51 is caused to be swung transversely of the vehicle when the lever is actuated through the medium of a reach-rod 53 which is connected either directly or otherwise to an operating means (not shown) such as a pedal or lever.

For the purpose of adjusting the brake operating mechanism, above described, the rod 46 is screw threaded as at 46¹ for engagement with an internally threaded sleeve 47 and likewise with a lock nut 48. The sleeve 47 is formed at one end with a peripheral rib and upon its other end is a removable collar or nut 50 which are engageable with the arm 51 of said bell-crank lever.

In the modified construction shown in Fig. 4, instead of employing toggle links for moving apart the cams 38 and 39, as above described, the rod 46 is provided with a wedge shaped head 46² having at its opposite sides inclined surfaces X arranged to engage against the inner sides of the cams or, preferably, against rollers 38¹ and 39¹ carried by the respective cams. In this embodiment, the movement of the rod 46 toward the right hand (Fig. 4) causes the wedge shaped rod head to be drawn between the cams to force the latter apart into brake applying positions, but when the rod is moved in the opposite direction the cams are permitted movement toward each other.

The steering knuckle 13 is provided with an arm 54 which is operatively connected with the steering mechanism of the vehicle in any known or suitable manner.

My improved brake operating mechanism is so constructed and arranged that when the associated wheel 15 is disposed to direct the vehicle straight the ridges 42 of both of the cams 38 and 39 will be in opposed relation with respect to the brake shoes.

With the parts thus arranged, when the crank lever 51—52 is influenced to effect the spreading apart of the cams the brake shoes are caused to engage the drums.

When the wheel 15 for steering is turned to present the cam surfaces 41 opposite the brake-shoe thrust elements 31, the spreading apart of the cams will cause the brake shoes to be applied with less force than when the wheel is straight with the vehicle because the cam surfaces 41 are incapable of being carried as far as the protruding ridges.

When the wheel is turned in the direction denoted by arrow A, the thrust elements 31 are brought into inoperative relation with the cam.

It is to be understood that the ridges 42 and the cam surfaces 41 of a wheel, corresponding to 15, but at the left hand side of a vehicle are arranged reversely from those of the right hand wheel assembly which is illustrated.

By such an arrangement when the vehicle is turning to the right the brake shoes of the right wheel only are applied, and when turning to the left the brake shoes of the left wheel only are applied, in other words— when turned, the cam surfaces 41 are operable to apply the brake shoes associated with the wheel which is traveling in the smaller arc.

What I claim; is,—

1. In a vehicle, a steering wheel, an axle, connections including a knuckle joint between the wheel and the axle, a brake drum secured to the wheel, brake-shoes for the drum, a spring tending to retain the shoes out of engagement with the drum, companion cams pivotally connected to the axle for horizontal movements toward and from each other, and means interposed between the cams for spreading the same apart into brake-applying relations with the brake shoes when the wheel is directed to steer the vehicle straight or toward one side but not toward the other side.

2. In a vehicle, a steering wheel, an axle therefor, a brake drum, brake shoes disposed within the drum at opposite sides of the axis thereof, pivotal connections for the respective shoes, means for adjusting said connections in upwardly diverging directions, horizontally separable devices disposed between the upper portions of brake shoes, and manually operable means connected to the axle for controlling the action of said devices for applying the brake shoes to the drum.

3. In a vehicle, an axle, a steering wheel, a brake drum carried by the wheel, brake shoes within the drum, cam-levers carried by the axle and extending between the brake shoes, a horizontally movable wedge device disposed between said cam levers, and means mounted upon the axle for imparting substantially rectilinear movements to said wedge device for transmitting motion to the cam levers for setting the brake shoes.

4. In a vehicle, an axle, a steering wheel, a brake drum on the wheel, brake shoes carried at opposite sides of the drum axis and in operative relation to the drum, pivotal supports for the lower ends of the shoes below the wheel axis, a contractile spring connecting the upper ends of the shoes with each other, means for limiting relative movements of the shoes with respect to each other, cam devices located between the shoes above the wheel axis, pins provided on the axle for pivotally connecting the cam devices to the latter, and means carried by the axle for transmitting motion to the cam devices for setting the brake shoes to the drum.

5. In a vehicle, an axle, a steering wheel, a brake drum on the wheel, brake shoes carried at opposite sides of the drum axis and in operative relation to the drum, relatively adjustable pivotal supports for the lower ends of the shoes below the wheel axis, a contractile spring connecting the upper ends of the shoes with each other, means engaging the shoes for limiting relative movements of the shoes with respect to each other, cam devices located between the shoes above the wheel axis, pins provided on the axle for pivotally connecting the cam devices to the latter, and means carried by the axle for transmitting motion to the cam devices for setting the brake shoes to the drum.

6. In a vehicle, a steering wheel, an axle, a knuckle joint connecting said wheel to the axle, a brake drum rigid with the wheel, a pair of brake shoes, a spring acting to yieldingly retain the brake shoes in disengaged relation with respect to the drum, relatively expansible cam devices supported by the axle and arranged to operate between the brake shoes, and means for spreading said cam devices apart to effect the engagement of the brake shoes with said drum.

7. In a vehicle, a steering wheel, an axle, a knuckle joint connecting said wheel to the axle, a brake drum rigid with the wheel, a pair of brake shoes, a spring acting to yieldingly retain the brake shoes in disengaged relation with respect to the drum, relatively expansible cam devices supported by the axle and arranged to operate between the brake shoes, and means including a wedge for spreading said cam devices apart to effect the engagement of the brake shoes with said drum.

8. In a vehicle, a steering wheel, an axle, a knuckle joint connecting said wheel to the axle, a brake drum rigid with the wheel, a pair of brake shoes, a spring acting to yieldingly retain the brake shoes in disengaged relation with respect to the drum, relatively expansible cam devices supported by the axle and arranged to operate between the brake shoes, and means including a wedge for spreading said cam devices apart to effect the engagement of the brake shoes with said drum when the wheel is regulated to steer the vehicle straight and also when regulated to turn the vehicle toward one side only.

9. In a vehicle, an axle, a steering wheel carried thereby, a brake drum on the wheel, brake shoes within the drum, a horizontally expansible structure carried by the axle and located between the brake shoes in axial alinement with the fulcrum point of the steering wheel, said expansible structure having its outer edge of irregular configuration, whereby pivotal movement of the wheel will cause different portions of the said irregular edge to be presented to the brake shoes, and means for expanding said structure.

10. In a vehicle, an axle, a steering wheel carried thereby, a brake drum on the wheel, brake shoes within the drum, a horizontally expansible structure carried by the axle and located between the brake shoes in axial alinement with the fulcrum point of the steering wheel, said expansible structure having its outer edge of irregular configuration with the diametrically opposed portions of the edge of similar configuration, whereby pivotal movement of the wheel will cause different portions of the said irregular edge to be presented to the brake shoes, and means for expanding said structure.

11. In a vehicle, an axle, a steering wheel carried thereby, a brake drum on the wheel, brake shoes within the drum, a horizontally expansible structure carried by the axle and located between the brake shoes in axial alinement with the fulcrum point of the steering wheel, a wedge for expanding said structure, manually operable means for actuating said wedge, and means for adjusting the connection between the wedge and the manually operable means to effect different degrees of actuation of the wedge.

Signed at Seattle, Washington, this 25th day of July, 1924.

THOMAS C. MORRIS.